(12) United States Patent (10) Patent No.: US 8,509,150 B2
Bahr (45) Date of Patent: Aug. 13, 2013

(54) METHOD AND DEVICE FOR CREATING AT LEAST ONE EXPANSION OF AN ASSOCIATION MESSAGE FOR WIRELESS MESH NETWORKS

(75) Inventor: Michael Bahr, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 218 days.

(21) Appl. No.: 12/991,608

(22) PCT Filed: May 7, 2009

(86) PCT No.: PCT/EP2009/003271
§ 371 (c)(1),
(2), (4) Date: Dec. 28, 2010

(87) PCT Pub. No.: WO2009/135676
PCT Pub. Date: Nov. 12, 2009

(65) Prior Publication Data
US 2011/0110303 A1 May 12, 2011

(30) Foreign Application Priority Data

May 9, 2008 (DE) .......................... 10 2008 022 917

(51) Int. Cl.
*H04W 4/00* (2009.01)
(52) U.S. Cl.
USPC ........ 370/328; 370/331; 370/335; 370/395.4; 370/406; 370/433
(58) Field of Classification Search
USPC ................. 370/328, 331, 335, 442, 437, 433, 370/406, 395.4, 395.5
See application file for complete search history.

(56) References Cited

U.S. PATENT DOCUMENTS

| 7,085,241 | B1 * | 8/2006 | O'Neill et al. | 370/254 |
| 7,328,009 | B2 * | 2/2008 | Takeda et al. | 455/424 |
| 7,510,113 | B2 * | 3/2009 | Igarashi et al. | 235/379 |

(Continued)

OTHER PUBLICATIONS

International Preliminary Report on Patentability for PCT/EP2009/003271 (Form PCT/IB/373, PCT/ISA/237) (German Translation).

(Continued)

*Primary Examiner* — Ian N Moore
*Assistant Examiner* — Phong La
(74) *Attorney, Agent, or Firm* — Buchanan Ingersoll & Rooney PC

(57) ABSTRACT

The invention relates to a method for operating a mesh network, especially according to IEEE standard 802.11s, wherein the mesh network comprises a plurality of network nodes, which have outer edge nodes and inner network nodes. A first edge node forms a connection point for external first stations disjunctive to the network, and a second edge node forms a connection point for external second stations disjunctive to the network, wherein data packets are to be exchanged between the first and second stations. During a switch of an external station from one edge node to another edge node, especially from a coverage area of the first edge node to a coverage area of the second network node, the respective association information of the network nodes is updated by means of an association message while inserting a validity duration for the association of the external stations connected to the edge nodes. The invention also relates to a device for carrying out the method for operating a mesh network.

11 Claims, 18 Drawing Sheets

(56) References Cited

U.S. PATENT DOCUMENTS

| | | | |
|---|---|---|---|
| 7,616,615 B2* | 11/2009 | Sueyoshi et al. | 370/338 |
| 2003/0016624 A1* | 1/2003 | Bare | 370/217 |
| 2004/0190542 A1* | 9/2004 | Ono et al. | 370/432 |
| 2007/0038759 A1* | 2/2007 | Hanson et al. | 709/227 |
| 2007/0053334 A1* | 3/2007 | Sueyoshi et al. | 370/338 |
| 2008/0181176 A1* | 7/2008 | Lee et al. | 370/331 |
| 2009/0031130 A1* | 1/2009 | Hirano et al. | 713/170 |
| 2010/0172454 A1* | 7/2010 | Denteneer | 375/356 |

OTHER PUBLICATIONS

International Preliminary Report on Patentability for PCT/EP2009/003271 (Form PCT/IB/373, PCT/ISA/237) (English Translation).

Written Opinion of the International Searching Authority for PCT/EP2009/003271 (Form PCT/ISA/237) (English Translation).

International Search Report for PCT/EP2009/003271 dated Aug. 6, 2009 (Forms PCT/ISA/220, PCT/ISA/210) (German Translation).

International Search Report for PCT/EP2009/003271 dated Aug. 6, 2009 (Form PCT/ISA/210) (English Translation).

Written Opinion of the International Searching Authority dated Aug. 6, 2009 (Form PCT/ISA/237) (German Translation).

Huang et al., "A Mobility Management Scheme for Wireless Mesh Networks", Global Telecommunications Conference, 2007. GLOBECOM '07. IEEE, Nov. 1, 2007 IEEE, Piscataway, NJ, USA—IBN 978-1-4244-1042-2 ; ISBN 1-4244-1042-8, pp. 5092-5096.

802.11 Working Group of the IEEE 802 Committee: "IEEE P802.11s/D2.0 Draft Standard for Information Technology—Telecommunications and information exchange between systems—Local and metropolitan area networks—Specific requirements—Part 11: Wireless LAN Medium Access Control (MAC) and Physical Layer (PHY) specifications" IEEE, Piscataway, NJ, USA, 21. Mar. 21, 2008, pp. 1-263.

* cited by examiner

| Associated Device | Proxy MP | Validity Period | Sequence Number (Associated Device) | Associated Device | Proxy MP | Validity Period | Sequence Number (Associated Device) |
|---|---|---|---|---|---|---|---|
| STA_A_1 | MAP_A | unlimited | 34 | STA_B_1 | MAP_B | 457 | 245 |
| STA_A_2 | MAP_A | unlimited | 5678 | STA_B_2 | MAP_B | 123 | 2365 |
| STA_A_3 | MAP_A | unlimited | 156 | STA_B_3 | MAP_B | 33 | 8367 |
| STA_A_4 | MAP_A | unlimited | 965386 | STA_B_4 | MAP_B | 67 | 45 |
| STA_A_5 | MAP_A | unlimited | 25492 | DEV_P_1 | MPP_P | 1234 | unknown |
|  |  |  |  | DEV_P_2 | MPP_P | 3654 | unknown |

Fig. 16

METHOD AND DEVICE FOR CREATING AT LEAST ONE EXPANSION OF AN ASSOCIATION MESSAGE FOR WIRELESS MESH NETWORKS

CROSS-REFERENCE TO RELATED APPLICATIONS

This application is the United States national phase under 35 U.S.C. §371 of PCT International Patent Application No. PCT/EP2009/003271, filed on May 7, 2009, and claiming priority to German National Patent Application No. 10 2008 022 917.2, filed on May 9, 2008. Both of these applications are incorporated by reference herein.

BACKGROUND OF THE INVENTION

1. Field of the Invention

Embodiments of the invention concern methods and devices for creating at least one expansion of an association message for wireless mesh networks.

2. Background of the Related Art

WO 2008/122674 A2 relates to a method for operating a mesh-type network, specifically according to IEEE standard 802.11s, wherein the mesh network comprises a plurality of network nodes. From this it is known that six addresses are to be used in the data packets. As FIG. 1 shows, the $5^{th}$ and $6^{th}$ addresses E1 and E2 are used to store the MAC addresses of source nodes and sink nodes located outside the WLAN mesh network. The MAC addresses consist preferably of six octets which in turn consist of eight bits.

In this context, methods were proposed to show how a path calculation in the standard routing protocol of IEEE 802.11s, "Hybrid Wireless Mesh Protocol (HWMP)" may be used to route the connection between external nodes, i.e. network nodes which are not mesh nodes and therefore are located outside the mesh network and the corresponding mesh edge nodes, located next to these external nodes. These methods are, however, only suitable for long-lasting images (associations) between the external nodes and the mesh edge nodes. In particular, a mobility of stations STA_A_1 through STA_A_5, STA_B_1 through STA_B_4, STA_C_1 through STA_C_2, STA_D_1 through STA_D_2, STA_E_1 through STA_E_2, STA_F_1 and STA_G_1, which are connected respectively with the mesh access points MAP_A, MAP_B through MAP_G, but can switch from one mesh access point to the next, as shown in FIG. 2 by the mobile station STA_A_1 through STA_G_1 at the mesh access points MAP-A through MAP_G, is inadequately supported.

The proposed "Radio-aware Optimized Link State Routing (RA-OLSR)" protocol, which is an optional, proactive routing protocol of IEEE standard 802.11s [1, Section 11A.7], uses a proactive mechanism, to announce all associations between stations and mesh access points to all other mesh nodes. Each mesh access point has a locally known database, the so-called "local association base" (LAB), containing all stations associated with this mesh access point. The content of these local databases is periodically sent to all nodes in the mesh network, using so-called local association base announcement (LABA) messages. These messages store the data from the received messages in their so-called "global association base" (GAB) and thus they know to which mesh access point data packets addressed to certain stations need to be routed.

If a station switches from one mesh access point to another, the changes will be announced in the RA-OLSR-mesh network, at the latest in the next periodic LABA message. As shown in the drawing in FIG. 2, this means that the LABA message of the old mesh access point of the mobile station no longer contains the address of the mobile station and that the LABA message of the new mesh access point of the mobile station now contains the address of the mobile station.

Standard IEEE 802.1 which is currently being developed is WLAN Mesh Networking, Version "IEEE P802.11s™/D2.O Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment <number>: Mesh Networking". March 2008, pages I-XVII and 1-242—in the following called IEEE P802.11s/D2.0 Draft-Standard—in section "11 B.7.5 Proxy protocol" (pages 180-181) also describes elements for a so-called proxy protocol. These two proxy protocol messages, the so-called proxy update message (or association message) and the proxy update confirmation message (or association confirmation message) are to provide a general means for the any distribution of proxy information (or association information) in a wireless mesh network.

An association comprises an external node and a mesh node. This mesh node is called Proxy Mesh Point or Proxy MP and constitutes the mesh node where data packets of the external node enter the wireless mesh network (Ingress Proxy MP) or where data packets addressed to the external node exit the wireless mesh network (Egress Proxy MP). The Ingress Proxy MP particularly has to know to which Egress Proxy MP the data packets need to be routed.

The association messages in IEEE 802.11s are independent messages by definition and can be used by any routing protocol. In this situation, the routing protocol has to determine when and how the association messages are used, since the associations are part of the routes.

In WO 2008/122674 A2 a mesh network is shown, which explains the mode of operation of such a mesh network in conjunction with FIG. 3 below. This network only shows those mesh edge nodes needed for the explanation, e.g. a first mesh edge node MI, a second mesh edge node M2, a third mesh edge node M3 and a fourth mesh edge node M4. The mesh network can contain many more mesh nodes than those depicted. The paths between the two mesh edge nodes shown may pass via several mesh nodes. For the purpose of clarity, only one external source node SI and one external sink node DI have been extracted from the usually numerous external nodes. Between them and the corresponding mesh edge nodes MI . . . M4 there may be more nodes also.

For the mesh network depicted, it is defined that "external node" refers to those network nodes which are not mesh nodes and therefore outside the mesh network.

Furthermore, "mesh edge node" refers to a mesh node, which in addition to having connections to other mesh nodes also has connections to nodes that do not belong to the mesh network. In the context of IEEE 802.11s, these may be "mesh access points" with which regular WLAN stations (user nodes) may connect for communication via the mesh network or so-called "mesh portals" that have a connection to other networks, e.g. a wired Ethernet.

A mesh edge node used to connect an external source node with the mesh network is also called a mesh source node. A mesh edge node used to connect an external sink node with the mesh network is also called a mesh sink node.

BRIEF SUMMARY OF THE INVENTION

Within the context of embodiments of the invention, such "association tables" are defined that contain the associations between mesh edge nodes and external nodes. An entry in the association table describes the mesh edge node through which the indicated external node may be reached from the mesh network. In this case, the association table can on one hand consist of a "local part" that contains all associations of this mesh node in which the mesh node can reach the external node via an external interface, a so-called "non-mesh interface", and where only mesh nodes have a local part; and, on the other hand, it can be allotted to a "global part" that contains all known associations of other mesh nodes, in which the respective mesh node may reach the external node via the indicated mesh edge node, and each mesh node can have a global part.

In addition, the local and global parts of the association table can be implemented as two separate tables or as one common table. In the same way, each mesh node has an association table. The table index of the association table is the external node: Mesh nodes search the appropriate mesh edge node for a given external node.

It is further defined that "association messages" are messages used to announce associations to other mesh nodes within the mesh network. The external source node SI, which according to the figure can send data packets via the first mesh edge node MI into the mesh network, can be a station equipped according to Standard IEEE 802.11 or its derivatives for Wireless Local Area Network, while the first mesh edge node MI can function as a mesh access point.

The external sink node DI, as shown in the figure, can receive data packets from the mesh network via a third mesh edge node M3. In a real mesh network, DI can be a node in a wired Ethernet and M3 can be a mesh portal for example. In the mesh network depicted in FIG. 3, exactly one path exists and it is between the first mesh edge node MI and the third edge node M3. This path has been established for communication between the external source node SI and the external sink node DI. FIG. 3 also shows the routing tables and association tables resulting from assumptions made based on the example.

When switching from an external node SI or DI to another mesh edge node M1 . . . M4, it must be considered that the communication is often bidirectional. According to the example in FIG. 3, this means that the source node SI acts as the source node for the (unidirectional) communication directed from the source node SI to the sink node DI and that the sink node DI acts as the sink node; and for the (unidirectional) communication directed from sink node DI to source node SI, the source node SI functions as the sink node and sink node DI acts as source node.

The structure of the association tables and the definitions in FIG. 3 are explained in detail below.

As a minimum requirement for the association table, as far as columns are concerned, the following information types are provided:
  Address of external nodes (Key column)
  Address of related mesh edge nodes
  Timeout/remaining validity period for the association In addition, the association table is augmented by the following column:
  Type of information "inactive/active", with both values
    inactive: The association is currently not used for the transfer of data packets It can be that no path is available to the corresponding mesh edge node M1 . . . M4.
    active: The association is currently used for the transfer of data packets. There is a path to the corresponding mesh edge node M1 . . . M4.

When a data packet arrives for or from an external node at mesh edge node M1 . . . M4, the column "inactive/active" of the corresponding entry in the association table will be filled in with a value coded specifically to indicate "active" and the timeout is reset to the initial value. If the timer times out, i.e. no packet has been sent from the mesh edge node to the corresponding external node or no packet has been received by it, the column "inactive/active" is filled in with a specially coded value indicating "inactive".

Since the associations are really part of the path, the starting value of the timer of an association should match the timeout of the corresponding path in the mesh network. Therefore, the start value of the timer is taken from the corresponding routing messages; usually according to the IEEE 802.11s defined RREQ, RREP message or for the start value, the same value as that of the relevant mesh path.

The association message presented in the IEEE P802.11s/D2.0 Draft Standard in Section "7.3.2.99 Proxy Update (PU) information element" (pages 42-43), as shown in FIG. 4, offers only limited options for routing association information to other mesh nodes. In particular, it does not permit the source nodes to set a validity period for the associations. Also, the association message offers only limited support for sequence numbers which are important for identifying outdated association information. The sequence number SN contained in the association message can be used for this purpose, but is actually only serving as a unique identifier ID of an association message, so that the corresponding association confirmation messages can be correctly associated.

FIG. 4 shows an association message (Proxy Update) from the IEEE P802.11s/D2.0 Draft Standard, Section 7.3.2.99) whereby SN/ID represents the sequence number of the association message and N the number of the associated MAC addresses. ID is the abbreviation for "identifier". The Add/Delete flag determines if the contained association information is to be added (add, Value 0) or deleted (delete, Value 1).

The definition of the Proxy Update Element in the IEEE P802.11s/D2.0 Draft Standard, Section 7.3.2.99, as shown in the association message in FIG. 4, offers
  Support for the distribution of association information according to a hard-state method, which means the association information is set explicitly by a message and must also be explicitly deleted by a message.
  Only limited support for the distribution of association information with a soft state method, which means that even though the association information is set explicitly by a message, it will be implicitly deleted after a certain time period, unless it has been renewed by then. The value for the time period must be determined by the recipient of the association message. The sender of the association message is not able to set a default for the time period. It also not possible to set the time period with the source of the association message.
  The proxy update element contains a sequence number, which serves solely as an identifier of the association message, so that association confirmation messages can be associated with the relevant association messages.

The Local Association Base Announcement (LABA) message of the Routing Protocol RA-OLSR, which previously was contained in the earlier version of "IEEE P802.11s™/D1.06 Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment <number>: Mesh Networking". July 2007, pages I-XVII, 1-246—hereinafter IEEE P802.11s/D1.06 Draft-Standard, in section 7.3.2.79 (pages 46, 47), lists the address of a mesh access point (Proxy MP) and address and sequence number for end devices associated with it.

The distribution of a larger plurality of association messages can also be achieved by sending several association messages, if these only offer limited configuration options. However, these configuration options must not be too limited. Sending multiple association messages does increase communications overhead due to repeated accessing of the air interface, compared to one single association message.

A preferred embodiment provides a method for the operation of a type of mesh network, specifically acc. the IEEE Standard 802.11s, consisting of a plurality of network nodes and by a corresponding device to implement this method acc. to claim 13. The invented method for operation of a mesh network, specifically acc. to IEEE standard 802.11s has the following characteristics:

a. the mesh network is formed by a multitude of network nodes, comprising external edge nodes (M1, M2, M3, M4; MAP_A, MAP_B, . . . , MAP_G) and internal network nodes (L1, L2; M_H, M_I), b. at least one first edge node (MAP_A) serves as a connection point for first stations disjunctive to the network (STA_A_1, STA_A_2, STA_A_3, STA_A_4, STA_A_5) and at least a second edge node (MAP_B) serves as a connection point for second stations that are disjunctive to the network (STA_B_1, STA_B_2, STA_B_3, STA_B_4), whereby the first and second stations are external stations in relation to the mesh network, c. there is to be an exchange of data packets between the first and second stations disjunctive to the network, and d. in the event of a switch of a disjunctive station from one edge node to another, especially from one radio coverage area of the first edge node (MAP_A) to the radio coverage area of the second disjunctive network node (MAP_B), there is an update of the respective association information of the network node via an association message by means of the insertion of a validity period for the association of the disjunctive stations respectively connected to the edge nodes (MAP_A through MAP_G).

Embodiments of the invention include among others, a method and related device to create at least one expansion of the association message and its configuration whereby a generic use of the association message by any routing protocol is achieved. The invention concerns the following expansions, among others, of the association message:

a validity period for the association information,
a transfer of association information of any proxy MPs,
sequence numbers of association information.

Additional details and advantages of the invention are illustrated based on the prior art as shown in FIGS. 1, 2, and 3 in combination with the examples of embodiments of the invention as shown in FIG. 5 through 17, whereby the same identifiers in all figures will have the same meaning.

DETAILED DESCRIPTION OF THE INVENTION

Validity Period of Association Information

The association message or Proxy Update message acc. to IEEE P802.11s/D2.0 Draft Standard (Section 7.3.2.99 on page 42) is expanded in such a way that it allows all possible configurations of association information (Hard-State or Soft-State, whose validity period is determined by the source or the target).

Figure 5:
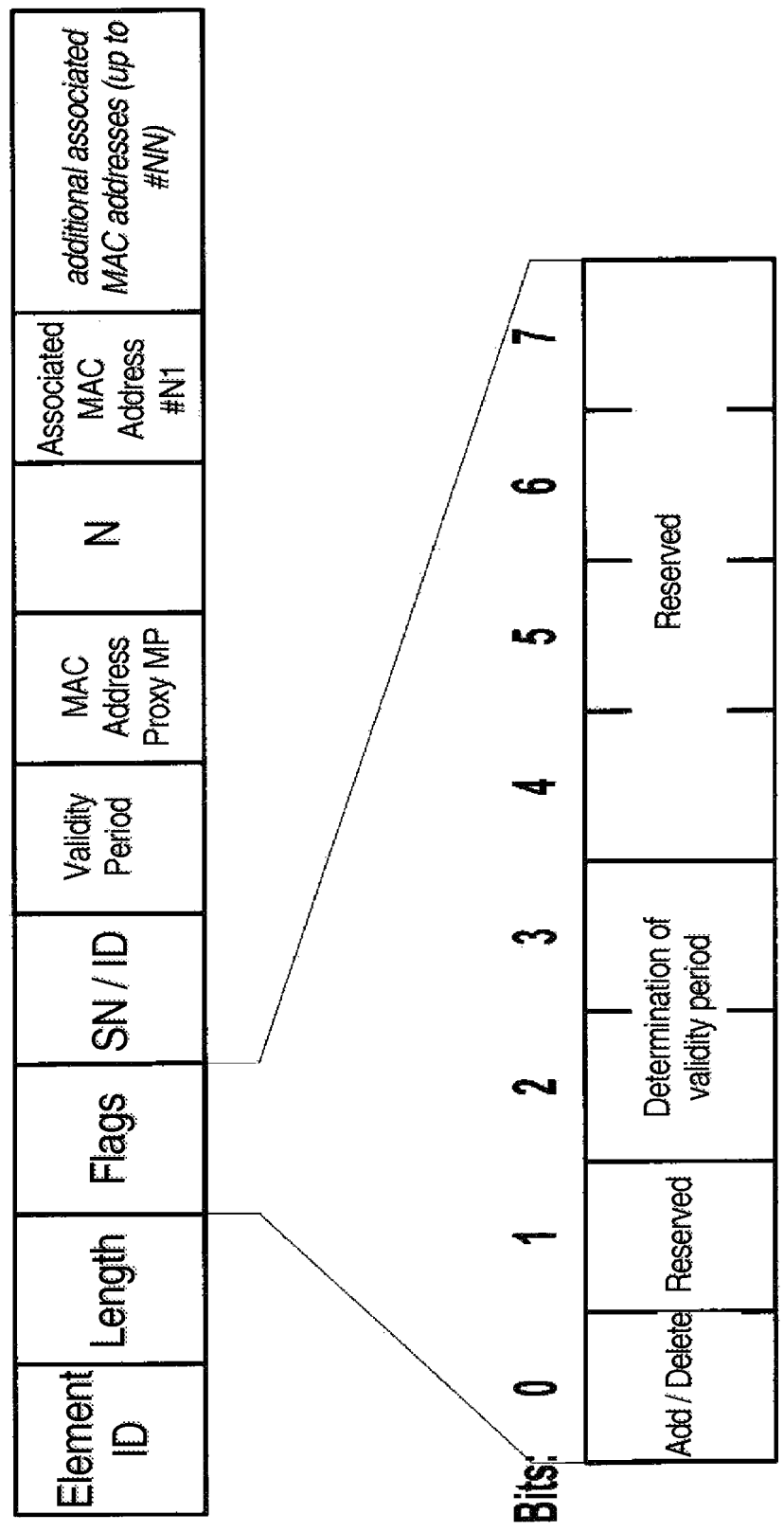

The following fields may be added to the association message:

Validity period of the association message (may be left out in some cases)
Information field determining the method to be used for the identification of the validity of the association information:
1. Hard-State: until the association information is explicitly deleted
2. Soft-State:

2a. The source determines the validity period
2b. The target determines the validity period An example can be found in FIG. 5, in which there is an association message which has been expanded by a validity period. SN/ID is the sequence number of the association message whereby the sequence number serves at the same time as the identifier ID, N is the number of MAC addresses which have been associated with the Proxy MP. An example for the implementation of the information field, which determines the method for the determination of the validity of the association information, is the use of bits 2 and 3 in the existing flags field (e.g. an octet) of the association message with the following values:

Bit 2=0: Hard-State, above method 1 (the value of Bit 3 is not important)
Bit 2=1: Soft-State, above method 2
    Bit 3=1: The source determines the validity period, above method 2a. The respective validity period can be found in the field for the validity period.
    Bit 3=0: The target determines the validity period, above method 2b.

For the above methods 1 and 2b there is no need for the validity period field, so the number of bytes to be transferred can be reduced. If that is the case, the value for method 2a in the information field also means that the field for the validity period must be inserted.

The information about the method to determine the validity can also be coded into the value of the validity period, so that no separate information field is required. For example, a possible hexadecimal code could be:

00 for method 2b
FF (highest possible value) for method 1.
Between 00 and FF (highest possible value) for method 2a In a first embodiment, the new information (validity period and method) is inserted into the association message only once. This information is then considered the same for all indicated associations. It is also possible that the individual associations have different validity periods. In that case, the validity period of the association and the information field for the method of determination of the validity of the association information according to the aforementioned mechanisms has to be listed separately for each association. Advantageously, the information field should allow the determination of whether the validity period and information field for the method will be indicated only once for all associations or separately for each association. In the case of same values, this will significantly reduce the amount of bytes to be transmitted.

Figure 6:
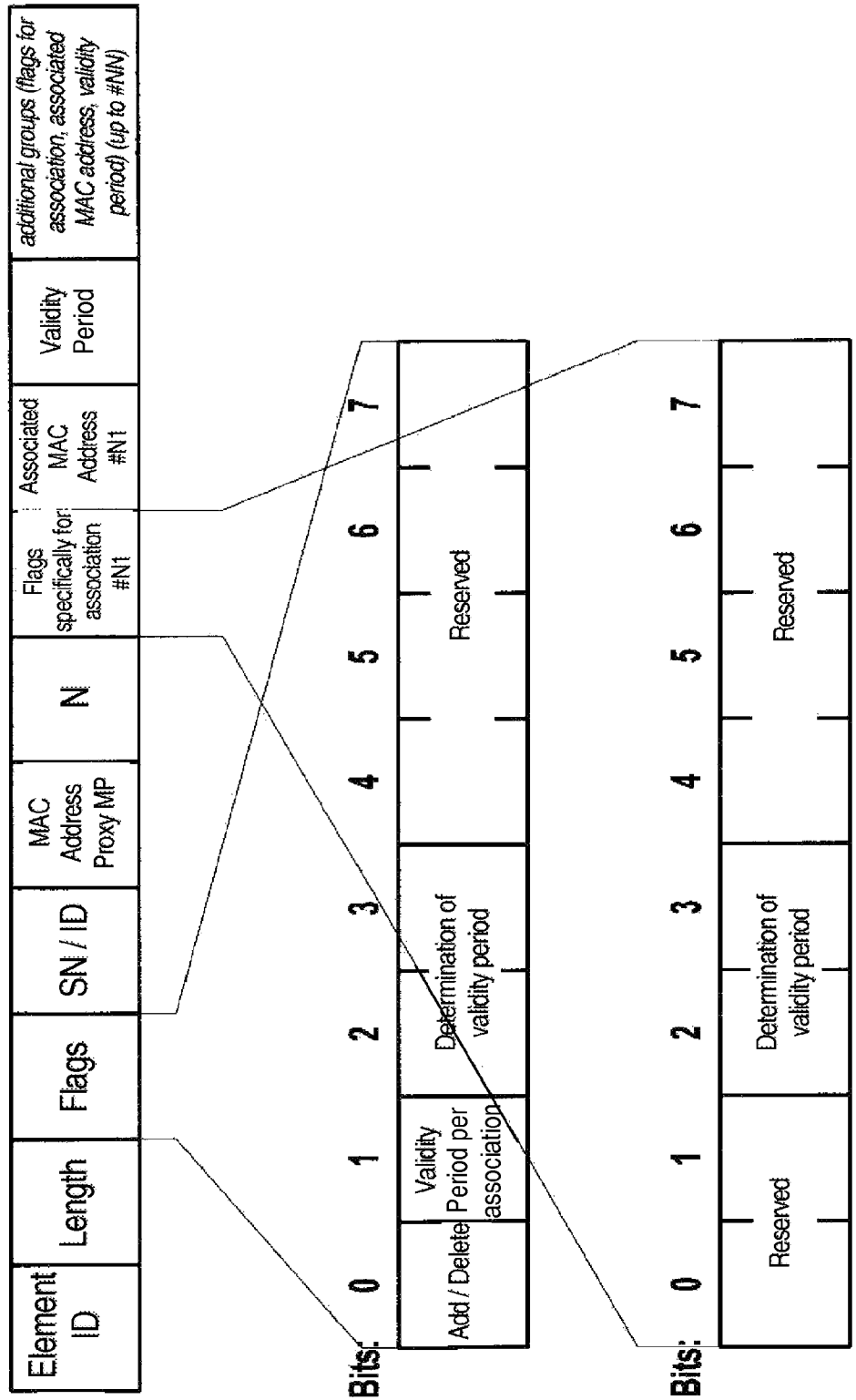

FIG. 6 shows an example for the separate indication of validity period and information field for the method; this association message has been expanded by one validity period per association. SN/ID is the sequence number of the association message, N is the number of the associations with flags relevant to the associations, the associated MAC address and the validity period. The Bit 1 in the flags field is set so that its value (e.g. 1) means that the validity period applies per association. Therefore, the general field for the validity period can be omitted also. Its absence can be detected based on this information field.

Any use of the validity period makes only sense for the addition of associations. The validity period does not matter in the deletion of associations.

Figure 1:
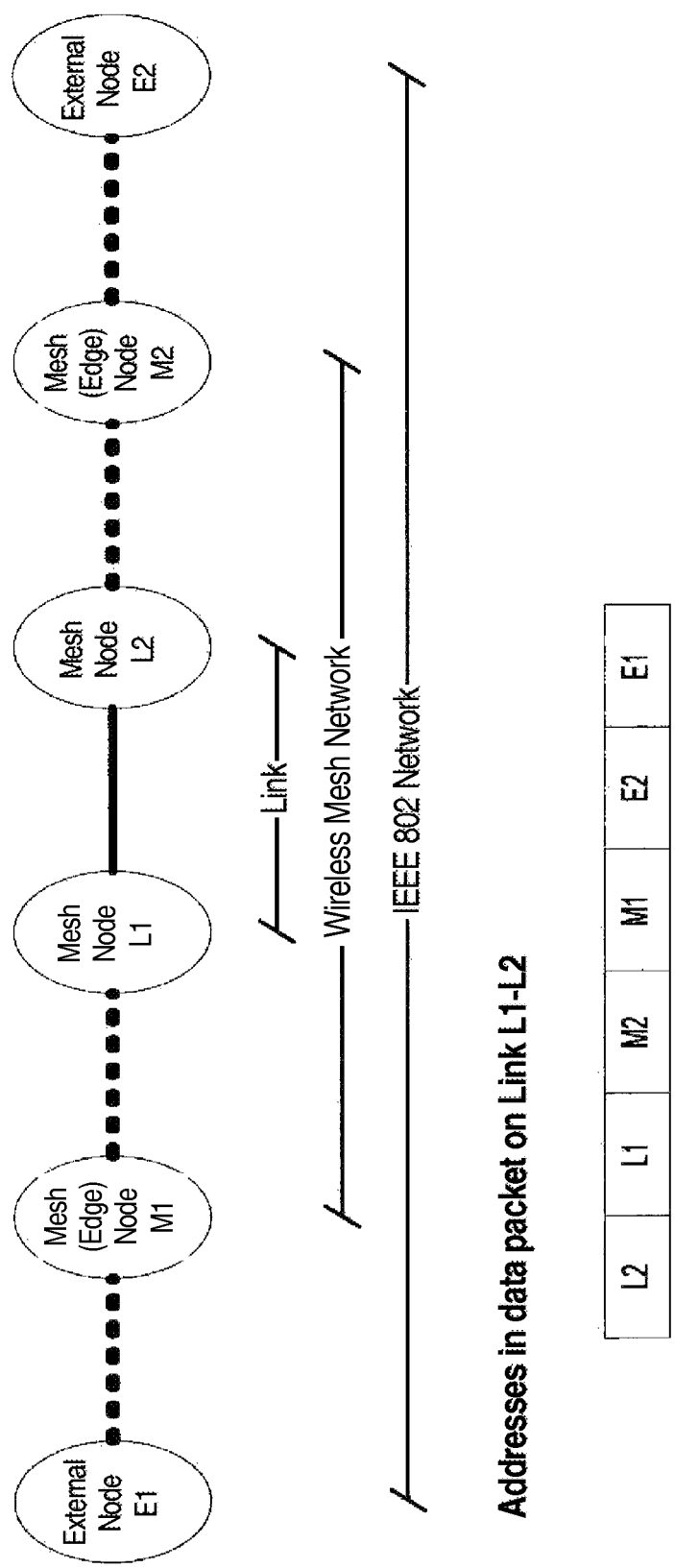
FIG. 1 a known 6 address template acc. to IEEE 802.11s.
Figure 2:
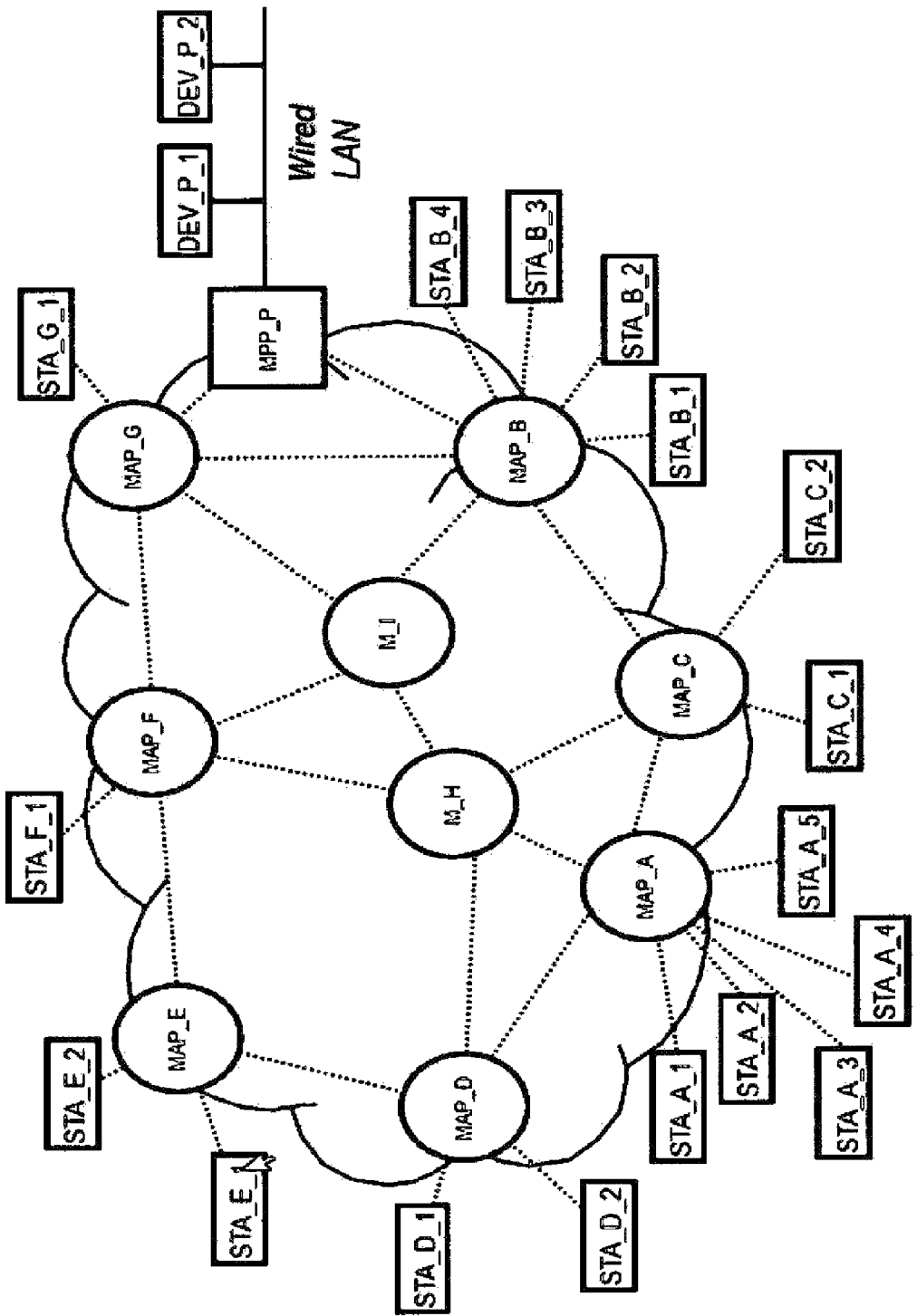
FIG. 2 a known wireless mesh network with mobile external stations, upon which the invention shall be applied, FIG. 3 an embodiment published in WO 2008/122674 A2, explaining the effect of the data packet transfer between external stations and allowing the application of the invention, FIG. 4 an association message (Proxy Update) from IEEE 802.11s Draft Standard D2.0, Section 7.3.2.99, FIG. 5 an association message acc. to the first embodiment according to the invention, expanded by a validity period, FIG. 6 an association message of a second embodiment according to the invention, expanded by one validity period per association, FIG. 7 an association message of a third embodiment according to the invention, expanded by any associations, FIG. 8 an association message of a fourth embodiment according to the invention, expanded by any associations with two different display areas for the associations, FIG. 9 an association message of a fifth embodiment according to the invention, expanded for any associations with two different display areas of the associations, the presence of which is controlled separately, FIG. 10 an association message of a sixth embodiment according to the invention, expanded by a separate flags field for two display areas of associations which are always present, FIG. 11 an association message of a seventh embodiment according to the invention, expanded by a separate flags field for any associations with two different display areas of the associations, the presence of which is controlled separately, FIG. 12 an association message of an eighth embodiment according to the invention, expanded by separate "add/delete" information field per association, FIG. 13 an association message of a ninth embodiment according to the invention, expanded by sequence numbers of the associated MAC addresses, FIG. 14 an association message with a tenth embodiment according to the invention, expanded by sequence numbers for associated MAC addresses with separate determination of the availability of the sequence number SN/ID per association, FIG. 15 an association message as an eleventh embodiment according to the invention, with a maximum of proposed expansions, FIG. 16 an association table of the mesh node MAP_A as an eleventh embodiment according to the invention, FIG. 17 an association message of a twelfth embodiment according to the invention, with a complete association table of the mesh node MAP_A and FIG. 18 an association message of a thirteenth embodiment according to the invention, with changes of the association table of the mesh node MAP_A.
Figure 3:
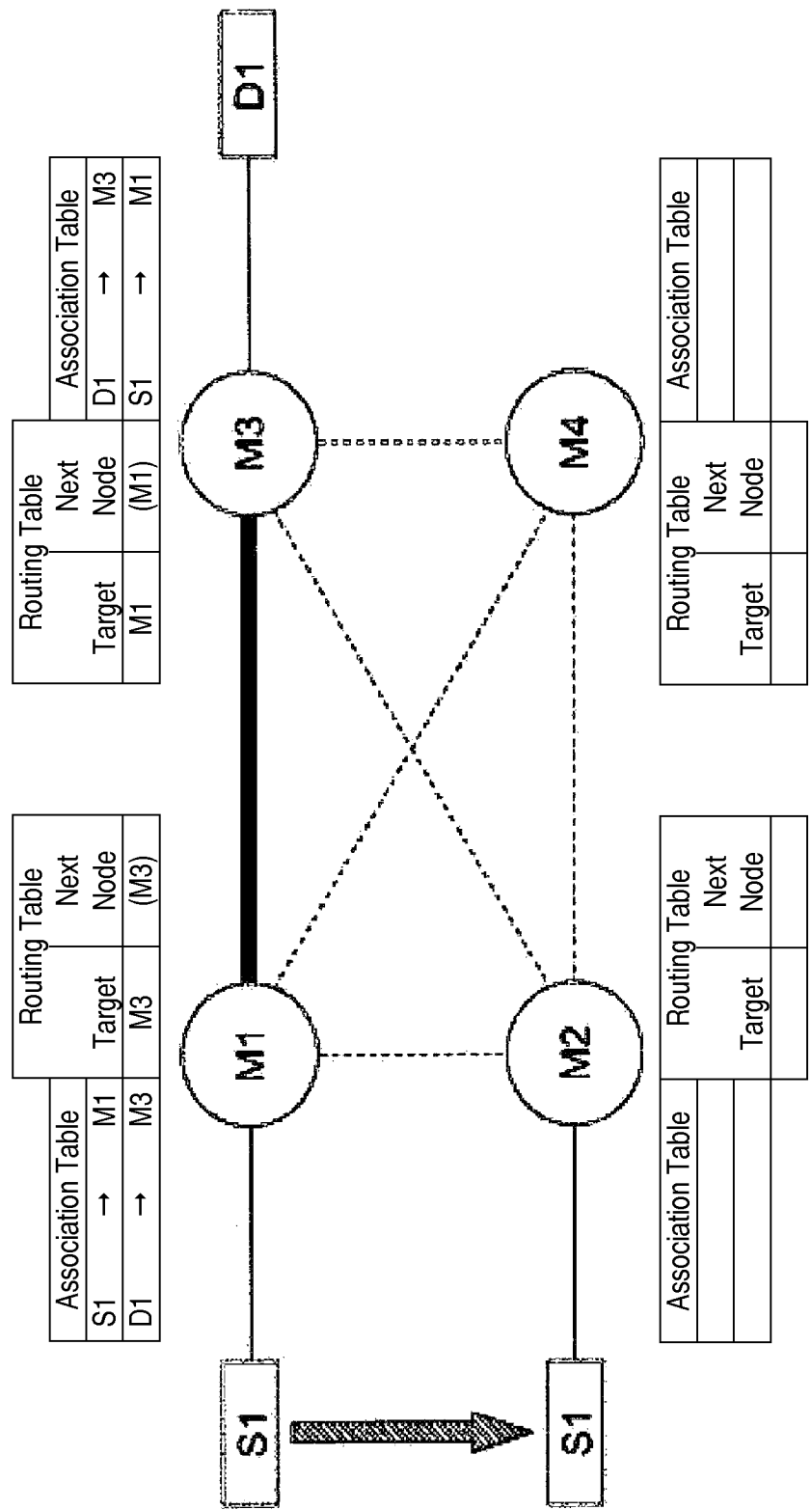
Figure 4:
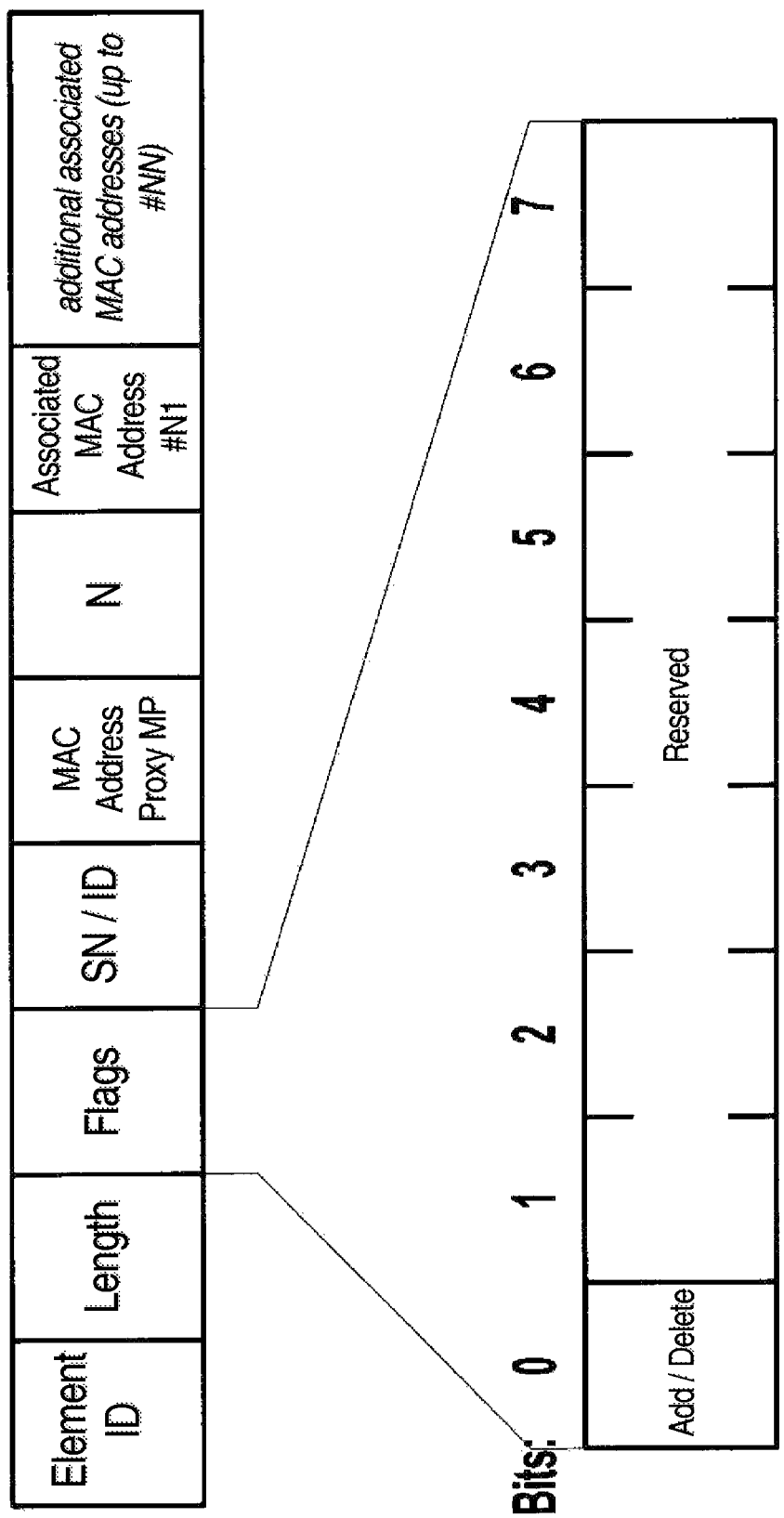
Figure 7:
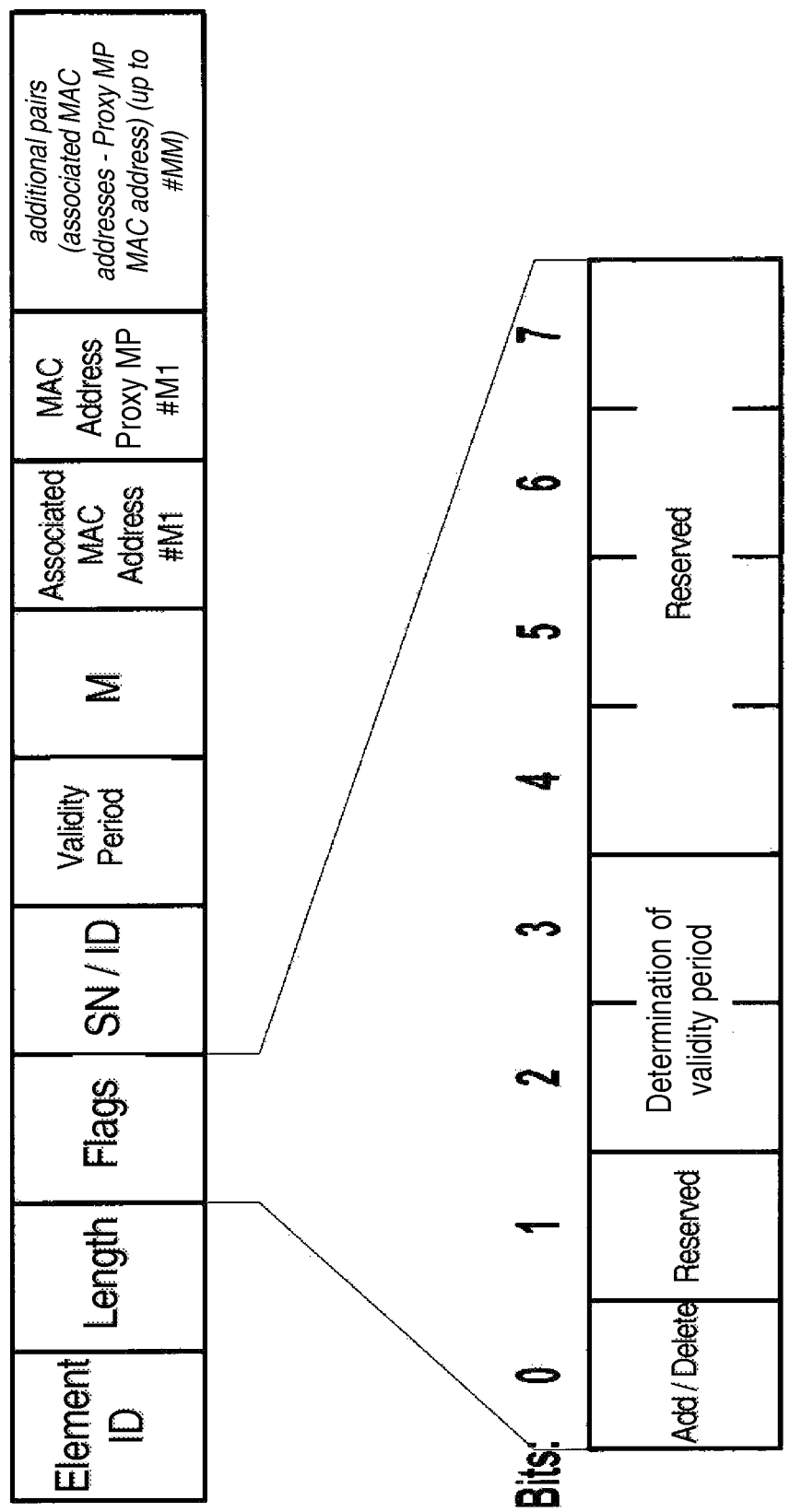

Transmission of Arbitrary Associations:

In order to transmit any associations within an association message, the Proxy MP and relevant associated end device have to be indicated together. The first step, therefore, is the expansion of the association message of the IEEE 802.11s Draft 2.0 Standard (FIG. 4) in such a way that the Proxy MP address and the address of the associated external device ("proxied device, proxied MAC address") are always indicated together. Field M indicates the number of associations. An example of this is in FIG. 7, showing an association message that has been expanded for any associations. SN/ID is the sequence number of the association message.

Some Proxy MPs can have many associated devices, e.g., mesh access points, with up to 256 associated end devices. In such a case, the address of the same Proxy MP occurs very frequently and results in a high number of unnecessarily transmitted bytes. It is, therefore, proposed to create two areas in the modified association message:

an area, indicating a single Proxy MP together with N associated addresses, which corresponds to the principle of the current association message acc. to IEEE 802.11s Draft 2.0 Standard and
an area indicating M complete associations consisting of Proxy MP and associated external device.

Figure 8:
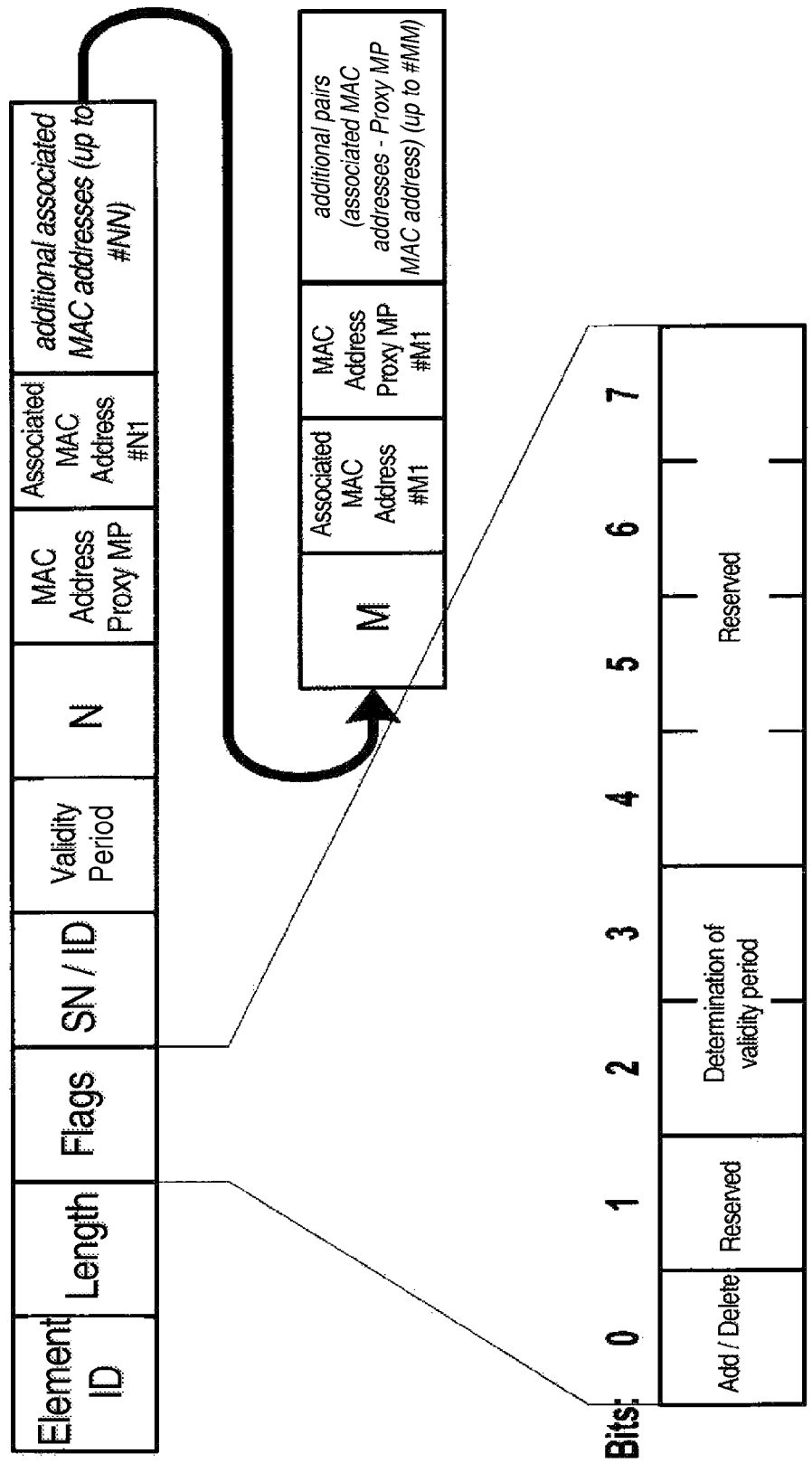

If an area contains no associations, the corresponding quantity of N or M is simply reset to 0. The value N may also determine the existence of the field for the Proxy MP address in the first area, in order to reduce the bytes that need to be transmitted. In that case, however, the Proxy MP address must follow the number of the associated addresses. FIG. 8 shows an example of this. Its association message has been expanded by two different display areas for any associations.

Figure 9:
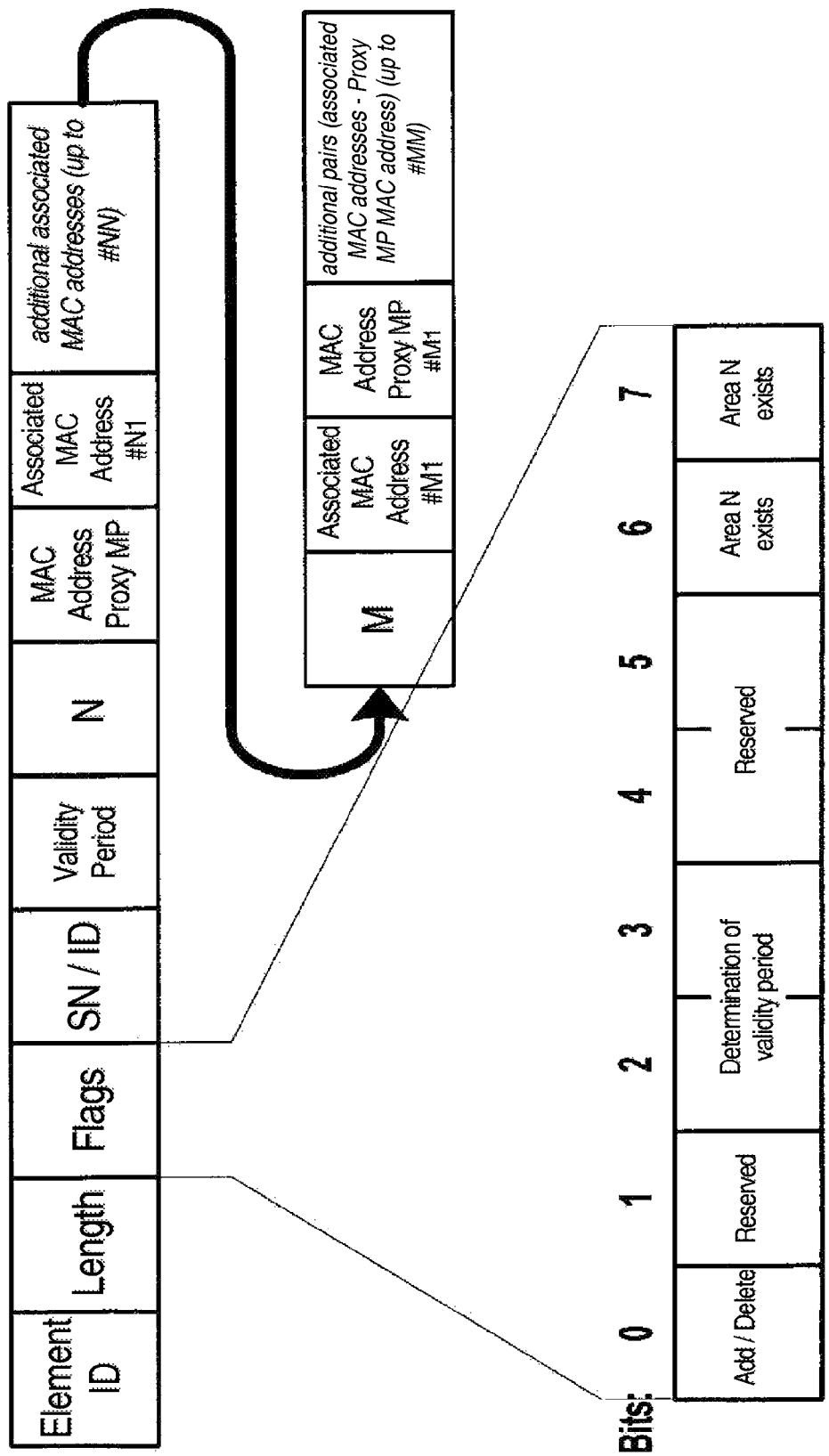

In a further advantageous embodiment, the presence of the areas can be controlled via information elements. In this case, however, the sequence in which the areas appear has to be clearly established. FIG. 9 shows an example of this. Its association message is expanded by two different display areas for any associations, whose presence is controlled separately.

Bit 6, set accordingly to a value of 1 in this example, shows the presence of a first area with exactly one Proxy MP with several associated addresses. This area comprises field N with the number of the associated addresses, the MAC address of the Proxy MP and the MAC addresses associated with N. Bit 7, set accordingly to a value of 1 in this example, shows the presence of a second area and all its associations. This area comprises field M with the number of associations as well as the M pairs of associated MAC addresses and Proxy MP MAC addresses.

Figure 10:
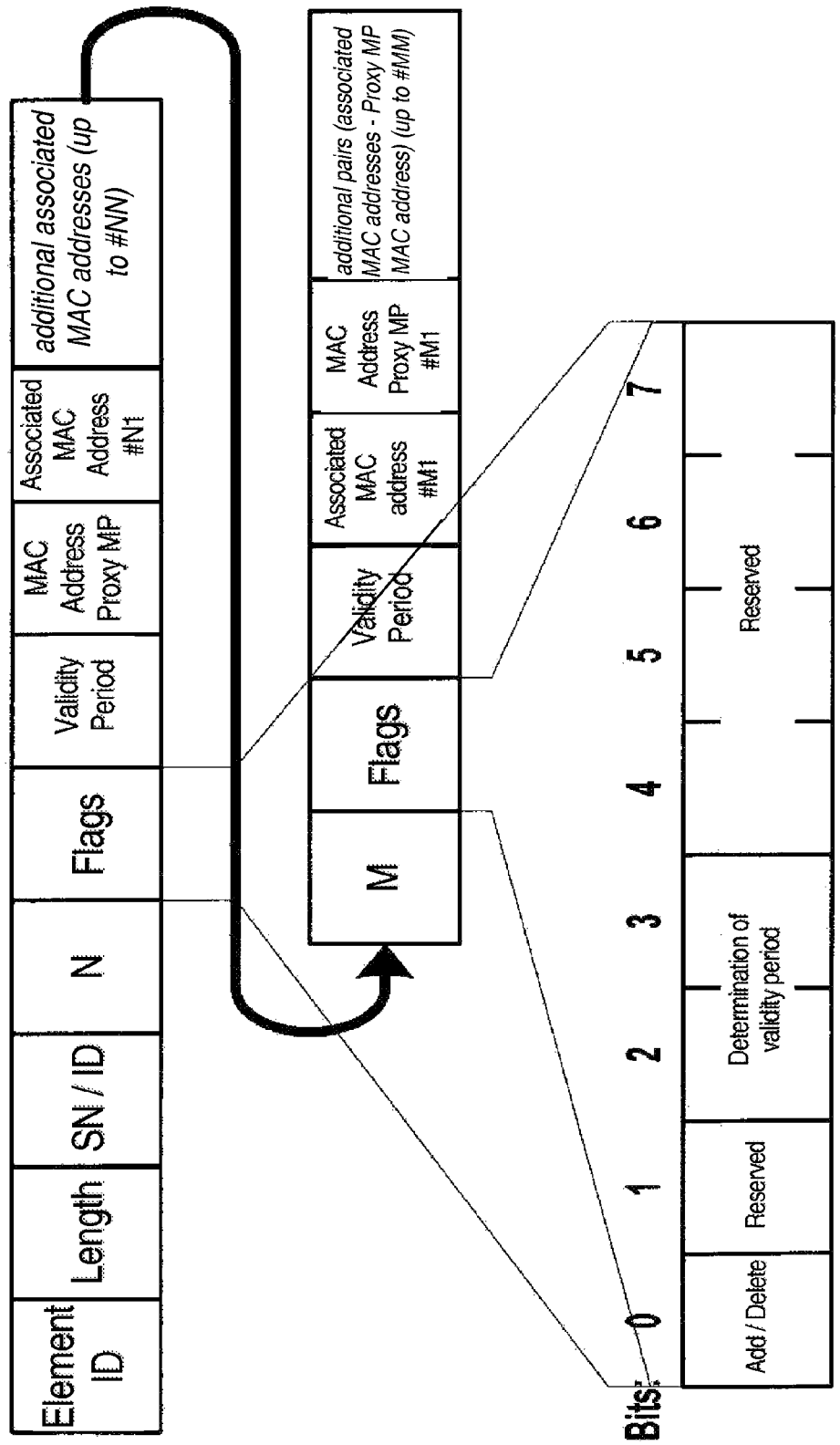

An advantageous expansion is the association of a separate flags field to both areas, N and M. In the case shown in FIG. 8, in which both areas are always present, the flags field and other fields containing information for all associations may therefore be omitted, since they are present in areas N and M respectively. If the number of associations in an area is 0, the corresponding flags field also does not have to be indicated. An example for the structure of such association messages is shown in FIG. 10; here, the association message has been expanded by a separate flags field for the ever present two display areas.

Figure 11:
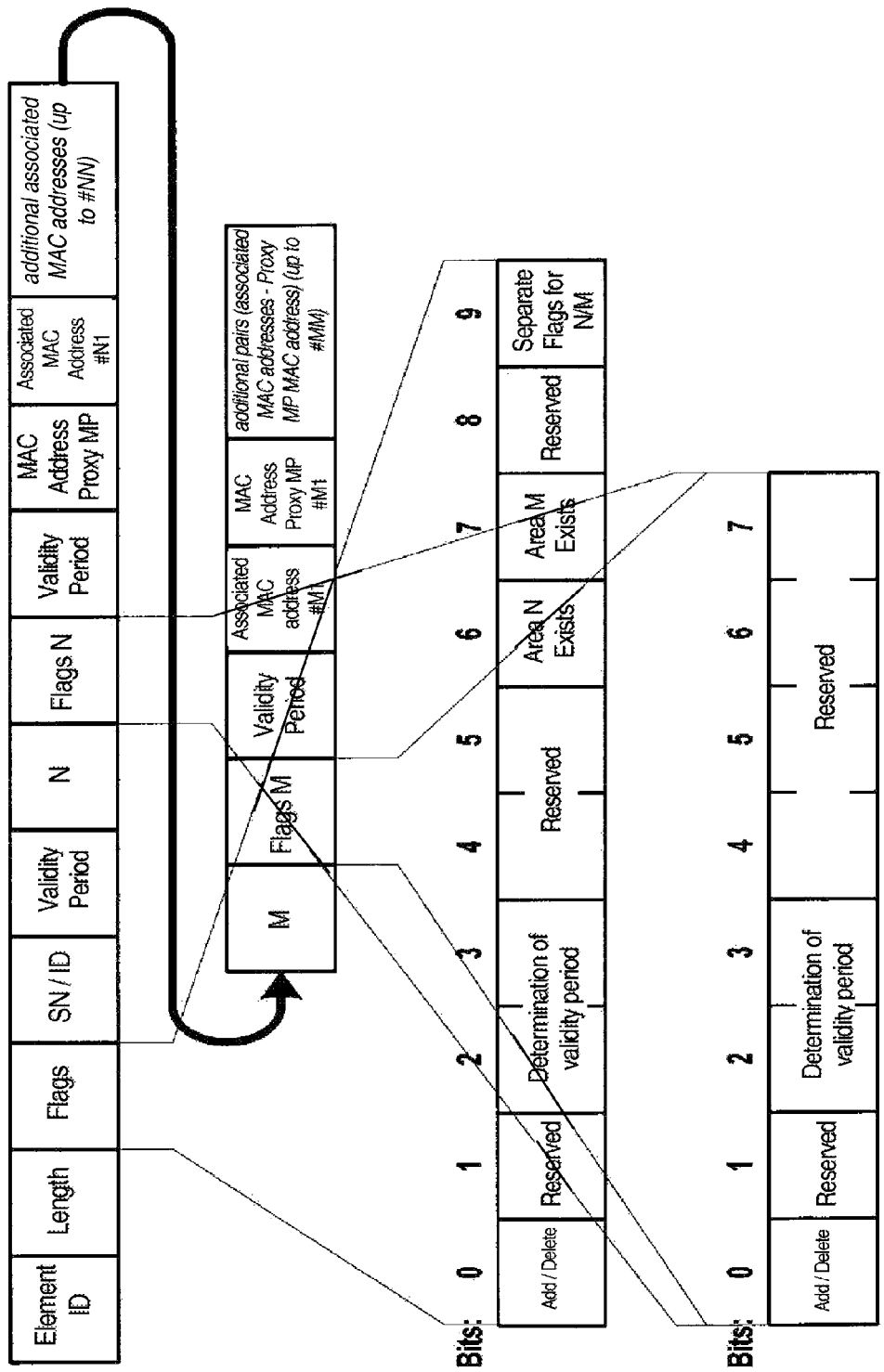

In the case depicted in FIG. 9, where the presence of areas N and M is controlled by related information fields, the global flags field has to always be present due to these information fields. In this variation, an additional information field in the global flags field offers control, if the information for the associations is taken from the global flags field and is the same, i.e. for all associations, especially the two areas N and M, or if the two areas N and M have separate flags fields. A corresponding example for the structure of such an association message is shown in FIG. 11. Here, the message has been expanded by a separate flags field for any associations with two different display areas, whose presence is controlled separately. A bit 9, set accordingly in the general flags field, e.g. to a value of 1, means that both areas N and M have their own flags field, which determines the configuration of the association information in the respective area. The configuration information for the association information in the general flags field is not evaluated.

Another advantageous expansion is an information field to control whether the information field "add/delete" applies to all associations or if there will be a separate information field "add/delete" for each association. The latter would allow the addition or deletion of association information with just one association message. In the first case, two association messages would have to be sent. The adding and deleting of associations with an association message prevents problems resulting from the loss of the "addition" or "deletion" association message.

Figure 12:
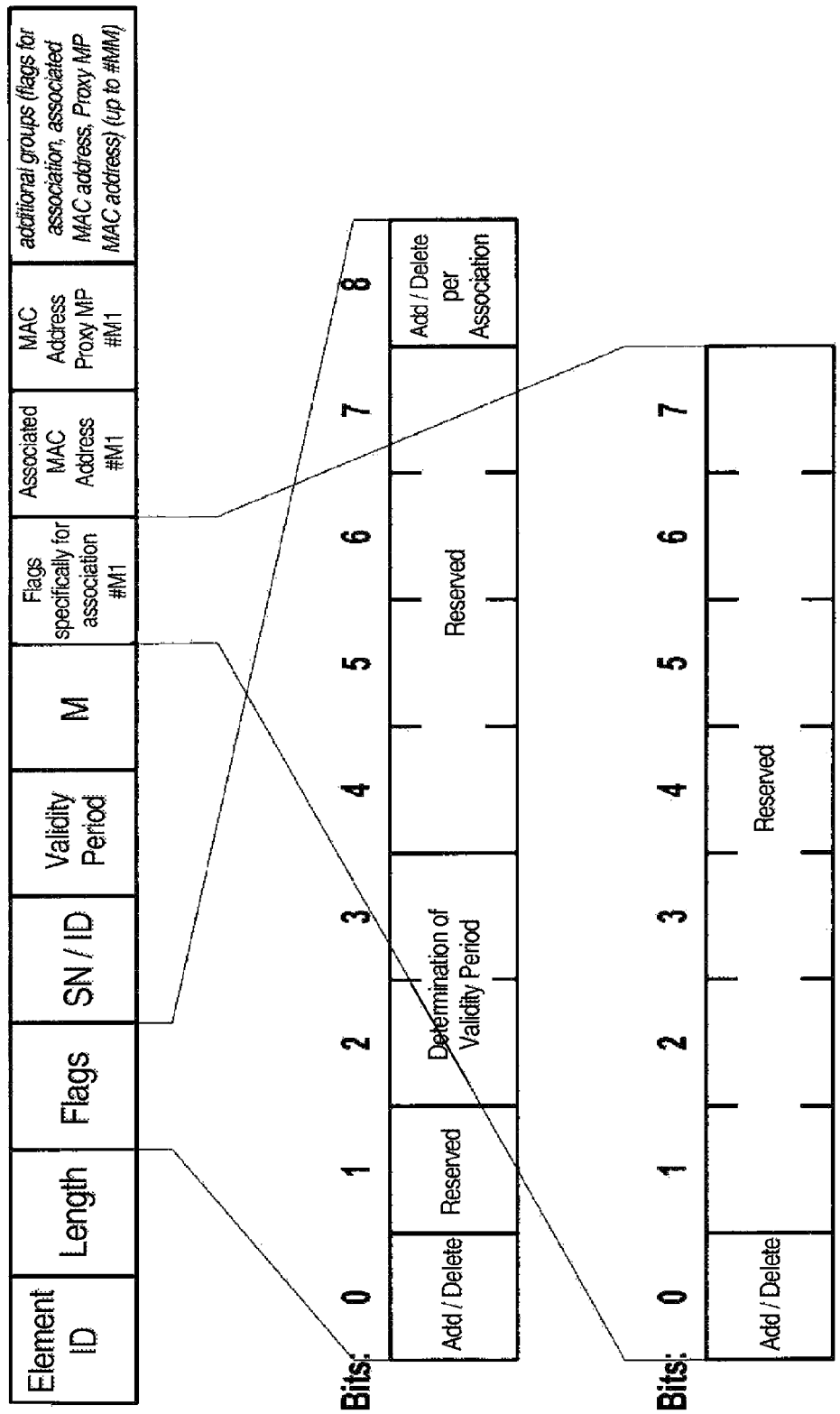

An example of an association message with a separate information field "add/delete" for each association is shown in FIG. 12. It is based on the association message from FIG. 7. FIG. 12 shows an association message expanded by a separate information field "add/delete" per association.

Sequence Numbers

If the sequence numbers are only associated with the Proxy MP, the time sequence is only recognizable as long as the Proxy MP for an associated device is not changed. In this way, cases are recognized in which, for example, the association messages have arrived at the target node with the association having been mixed up by adding and deleting of the same association. If an associated external device changes its proxy MP, the correct sequence of association information can only be recognized, if the sequence number SN/ID is associated with the associated external device.

Since sequence numbers have the largest information content when they are associated with external devices, and while there are also mechanisms which do not need such sequence numbers for the associations, the invention proposes including a corresponding information element for the specific sequence numbers present for the associated external devices.

Figure 13:
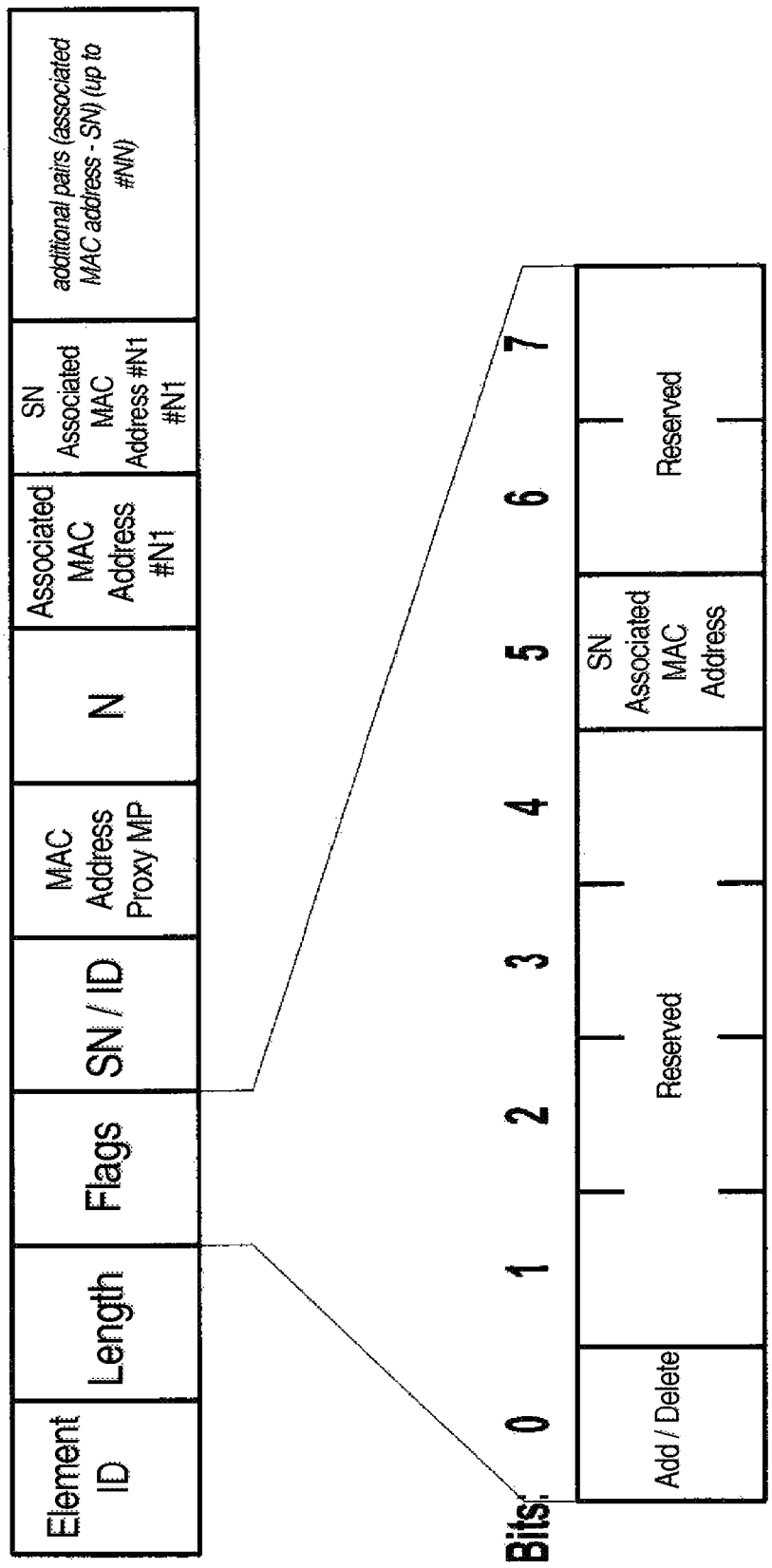

In the first embodiment, this information field is inserted only once into the association message. This applies then to all indicated associations. FIG. 13 shows an example for this. Its association message has been expanded by the sequence numbers of the associated MAC addresses. Bit 5, set accordingly in the flags field, e.g. to a value of 1, means that with each association the corresponding sequence number SN/ID of the associated device will also be indicated.

However, it is also possible, that no sequence number SN/ID is transmitted for some associations, while it is transmitted for others. In that case, the information field for the presence of the sequence number SN/ID must be indicated separately for each association. Preferably, it should be possible to use an information field to determine whether the information field for the presence of the sequence number SN/ID will be indicated only once for all associations or for each association separately.

Figure 14:
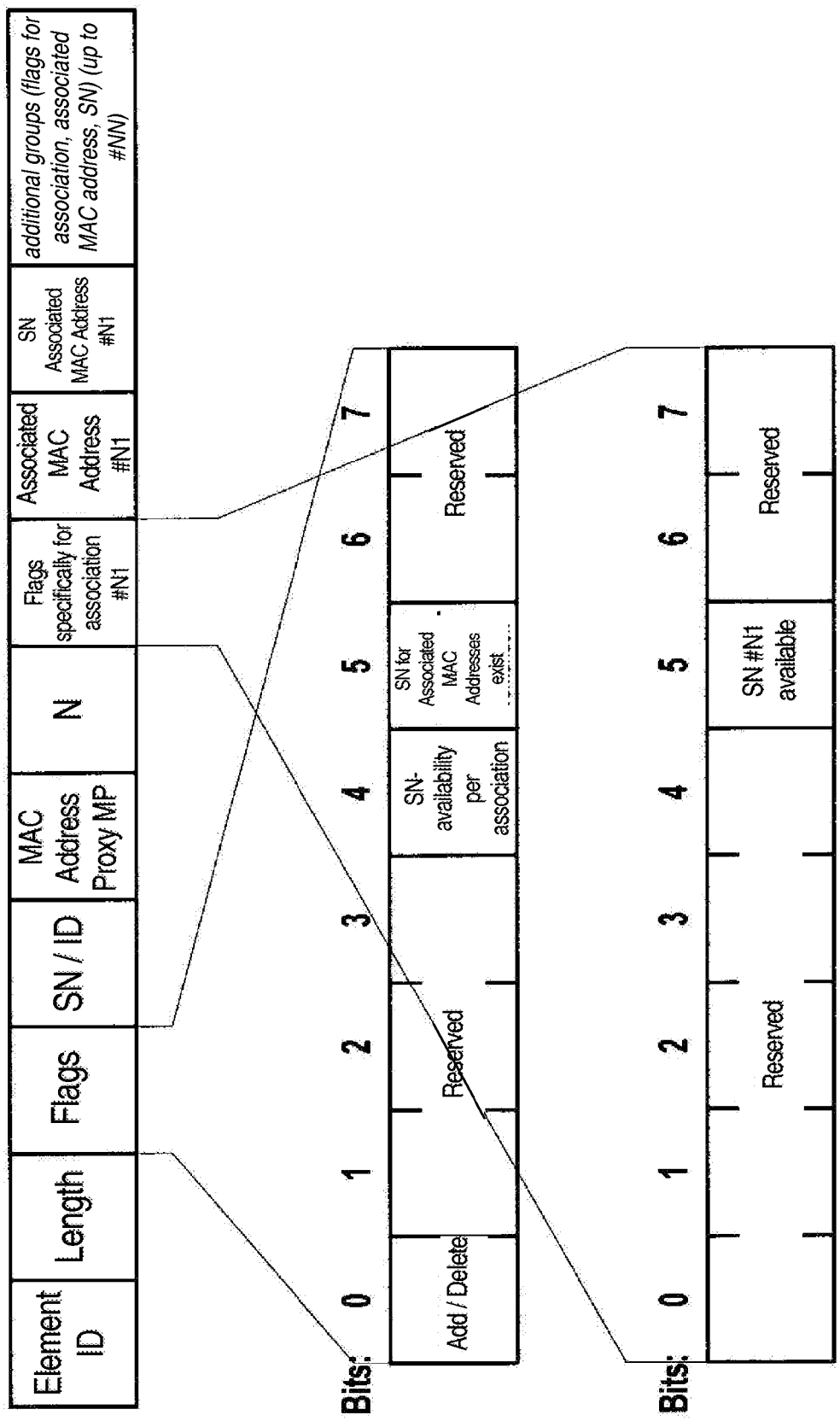

Since the technically required area for an information field is usually much larger than what is actually needed (1 byte=8 bit to 1 or 2 bit) the area for the information field identifying the method for the determination of the validity of the association information may also be used for the information field regarding the presence of the sequence number SN/ID. Using the corresponding established absolute (Bit) position, it is possible to distinguish between the two information fields. An example of a separate indication of sequence numbers is shown in FIG. 14. This association message has been expanded by sequence numbers for associated MAC addresses with separate determination of availability of the sequence number SN/ID per association. A bit 4 set accordingly in the general flags field, e.g. to a value of 1, means that for each association, a separate flags field exists in which the information is found as to whether the association has a sequence number SN/ID or not. This is determined in a bit 5, set accordingly, e.g. to a value of 1.

Figure 15:
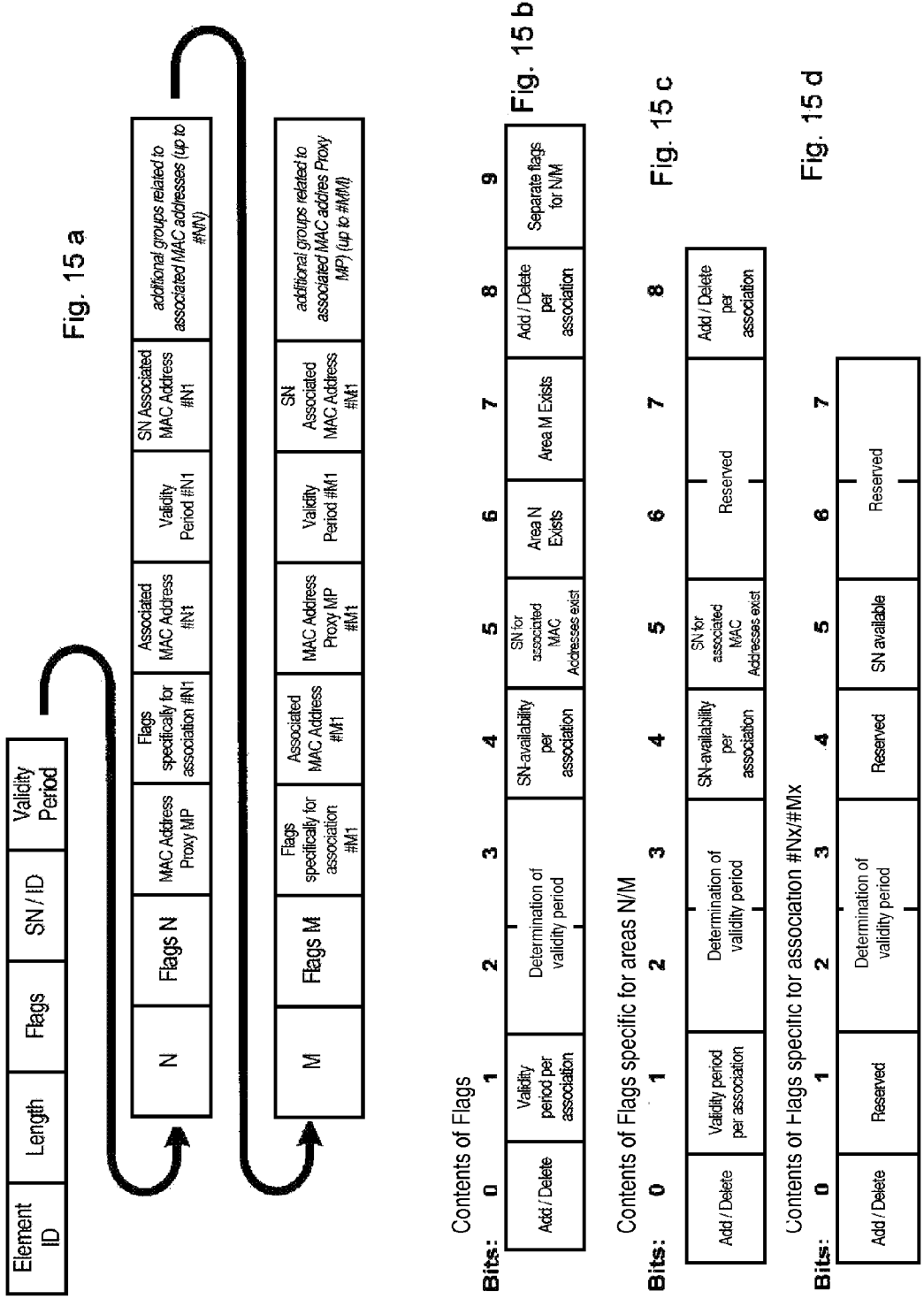

The Combination of All Expansions:

The expansions suggested by the invention can be implemented separately or together. FIG. 15 shows an example of a structure of an association message combining all described expansions, which offers the highest flexibility and facilitates a maximum of suggested expansions.

The invention describes expansions of association messages, especially of the association message acc. to IEEE 802.11s Draft Standard, 2.0 ([1], Section 7.3.2.99). With this message it is possible to use the respective association message in as many different routing protocols as possible, if needed. This especially concerns the validity period of association information, the number of displayable associations and the sequence numbers.

The structure of the association message described by the invention and the associated mechanisms allow the display of a variety of combinations of association, validity period, and sequence number SN/ID, providing high flexibility and usefulness of the association message.

With a less general structure of the association message, it might become necessary to send several associations in several association messages, since it is not possible, to show them correctly in just one association message. It might even happen that some associations cannot be transmitted at all, due to the limited structure of the association message. The invention allows the implementation and transmission of a great many associations in one and the same association message. This reduces overhead, especially the higher number of accesses to the air interface and it thereby saves transmission bandwidth.

The suggested information fields serve to control the structure of a respectively associated association message in a way that it contains as little redundant information as possible. This leads to a reduction of the data volume to be sent.

An embodiment is mesh node MAP_A, considered with the associations of mesh node MAP_A as listed in the table in FIG. 16. Mesh node MAP_A constitutes a mesh access point. It serves to connect end devices within the mesh network. The mesh access point MAP_A is the Proxy MP for those end devices. The embodiment shows five connected end devices STA_A_1, . . . , STA_A_5. The mesh node MAP_A also knows several associations, in which other mesh nodes are the respective Proxy MPs. In the embodiment, these are the following six associations:

four associations belong to another mesh access point MAP_B and are the four end devices STA_B_1, . . . . STA_B_4 connected to mesh access point MAP_B, and two associations belong to mesh node MPP_P, which is the portal of the Proxy MP for the two devices DEV_P_1 and DEV_P_2, connected via a wired LAN network.

Figure 17:
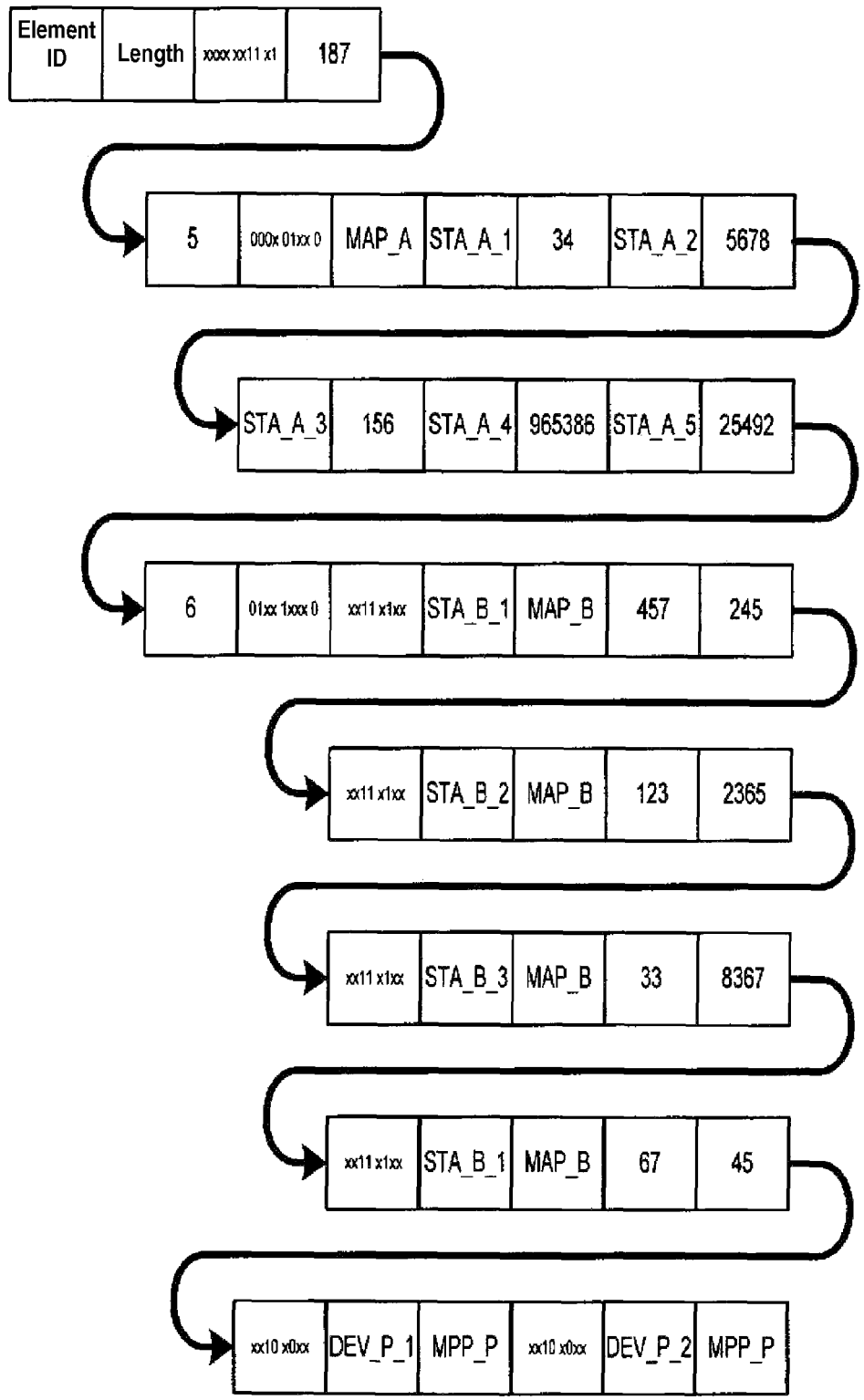

In the implementation example, mesh node MAP_A wants to communicate its complete association table to another mesh node MP_C in the mesh network. The validity period for the associations with MAP_A as the Proxy MP must be set according to the Hard-State method in mesh node MAP_C. The validity period for the associations with MPP_P as the Proxy MP must be set by the target node MAP_C. Therefore, mesh node MAP_A generates exactly one association message with the complete association table of mesh node MAP_A, according to the invention, as shown in FIG. 17. Its structure is based on the embodiment in FIG. 15.

The embodiment shows the following changes at mesh node MAP_A:

The end devices STA_A_2_ and STA_A_3 disassociate from the mesh access point MAP_A.

The end device STA_A_6 connects with the mesh access point MAP_A.

Figure 18:
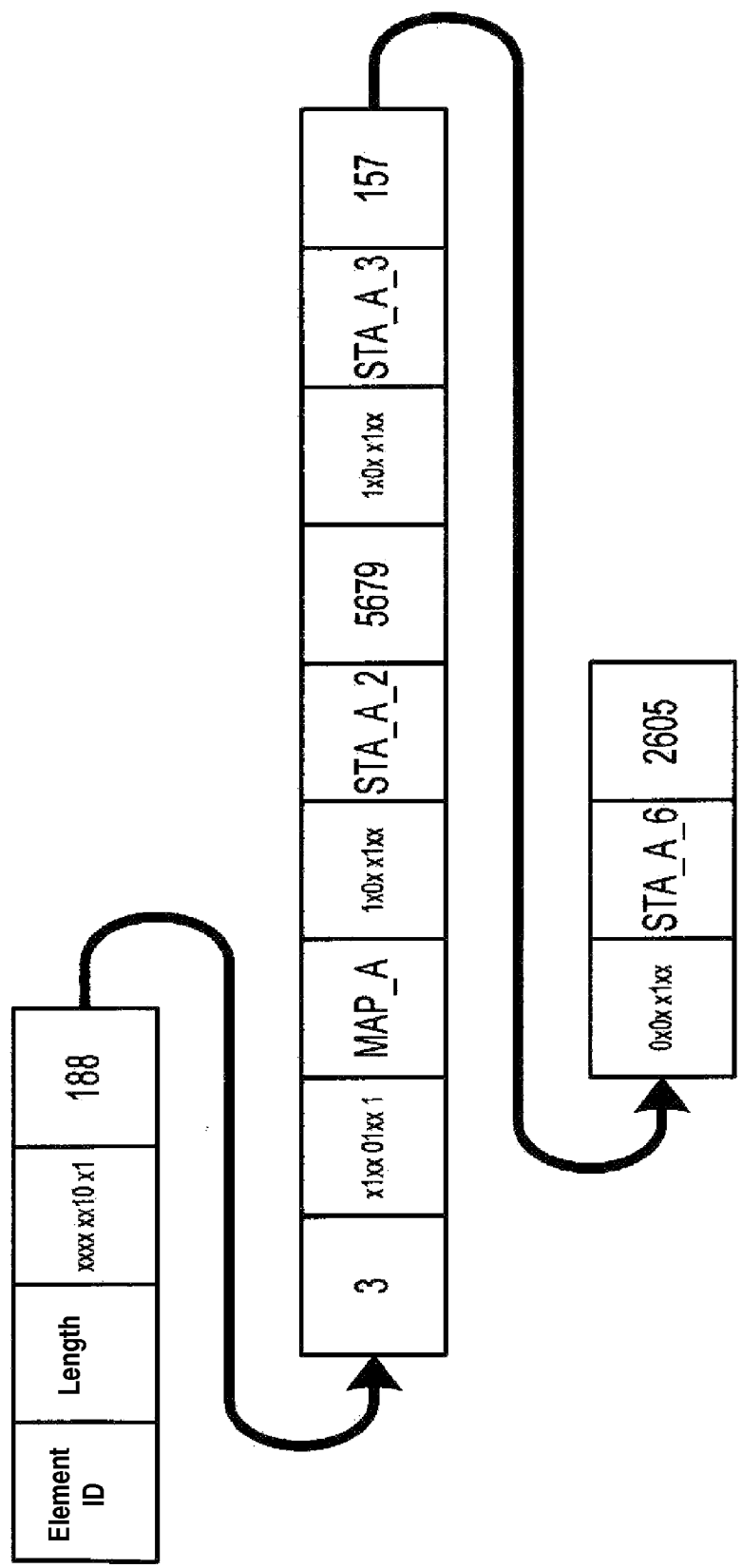

The mesh access point MAP_A would like to communicate these changes to mesh node MAP_C and for this purpose generates an association message with changes of the association table of mesh node MAP_A, according to the invention as shown in FIG. 18 and the structure of which is based on FIG. 15.

The device to apply the method to create at least one expansion of the association message may be implemented and operated in the software, hardware, or a combination of software and hardware. Individual steps of the procedure are implemented with specific units of the device.

The invention may be applied to any form of mesh networks, but preferably to WLAN networks, whereby preferably at least the network nodes located on the inside shall be connected to each other by radio. The edge nodes associated with disjunctive stations are considered external stations in relation to the mesh network and may also be connected via radio with the edge nodes.

The invention claimed is:

1. A method to operate a mesh network comprising:
    exchanging data packets between a first station and a second station disjunctive to the mesh network,
        wherein the mesh network comprises a plurality of network nodes, the network nodes comprising external edge nodes and internal network nodes, and
        wherein a first edge node of the network nodes serves as a connection point for said first station disjunctive to the mesh network, and wherein a second edge node serves as a connection point for said second station that is disjunctive to the mesh network, wherein the first and second stations are external stations in relation to the mesh network;
    switching the first disjunctive station from the first edge node to the second edge node;
    updating association information of the first edge node via an association message sent by the second edge node and received by the first edge node, the association message identifying the association information of the disjunctive stations that are external to the mesh network that are connected at at least one of a third edge node of the network nodes and the second edge node,
    wherein the association message has a structure having a plurality of fields, the fields comprising an element identification field, a length field, a flags field, a sequence number field, and at least one validity period field and at least one information field, the at least one validity period field having a value therein to indicate a validity period for at least a portion of the association information of the association message, and
    each of the at least one information field comprising at least one of:
    (i) a first area, the first area identifying the second edge node and identifying a plurality of disjunctive stations to which the second edge node is connected, and
    (ii) a second area identifying complete associations, each of the complete associations identified in the second area identifying the third edge node of the network nodes and a respective one of the disjunctive stations to which that third edge node is connected;
    wherein the at least one information field comprises a first information field that only has the first area, the first area comprising a plurality of fields, the fields of the first area identifying an address of the second edge node and an address for each of the disjunctive stations to which the second edge node is connected to identify associations the second edge node has with the disjunctive stations identified in the first information field;
    wherein the at least one information field also comprises a second information field that has the second area, the second area comprising a plurality of fields that each identify an address of the third edge node and an address for a respective one of the disjunctive stations to which that third edge node is connected to identify an association of the third edge node to that respective one of the disjunctive stations; and
    wherein the first area of the first information field has a flags field that has information identifying whether a validity period of one of the at least one validity period field applies to all associations of the first information field and the second information field has a flags field that has information therein to identify that a validity period of another one of the at least one validity period field applies to one of the associations identified in the second information field.

2. The method of claim 1, comprising: determining the validity period by individual bits of the flags field.

3. The method of claim 1, comprising: determining the validity period for all of a quantity of associations for the second edge node contained in the association message by individual bits of the flags field, wherein each association is valid for one address identified as being an address for one of the disjunctive stations to which the second edge node is connected that is identified in the first area.

4. The method of claim 1, wherein the switch of the first disjunctive station is a switch from one area of radio coverage of the first edge node to an area of radio coverage of the second edge node.

5. The method of claim 1 wherein the first information field has a field to identify whether associations for the identified disjunctive stations in the first information field is to be added or deleted and wherein the second information field has at least one field to identify whether at least one association identified in the second information field is to be added or deleted.

6. A method to operate a mesh network according to IEEE Standard 802.11s, comprising:
    exchanging data packets between at least one first station and at least one second station disjunctive to the mesh network,
    wherein the mesh network comprises a plurality of network nodes comprising external edge nodes and internal network nodes, and
    wherein at least one first edge node serves as a connection point for said at least one first station disjunctive to the mesh network, and wherein at least one second edge node serves as a connection point for said at least one second station that is disjunctive to the mesh network, wherein the first and second stations are external stations in relation to the mesh network;
    switching a disjunctive station from one edge node to another edge node;
    updating association information of a network node via an association message with an insertion of a validity period for the association information of respective disjunctive stations connected at the edge nodes;

determining the validity period for associations of any edge nodes contained in the association message by separate values, wherein a number of associations is indicated by value M;

determining the validity period for all N associations contained in the association message for an edge node and for all M associations contained in the association message for any other edge nodes by separate values that are individual bits that indicate if an area with N associations for the first edge node and an area of M associations for the other edge nodes in the association message respectively exist, a first validity period for the area with N associations and a second validity period for the area with M associations having separate additional flags fields in their respective areas; and providing an additional flags field in the association message that determines if the association message contains an additional flags field for the area with N associations and the area with M associations.

7. The method of claim 6 wherein the association message comprises an information field in an area of the flags field, which controls if an information field "add/delete" applies to all associations or if a separate information field "add/delete" applies to each association, so that association information may be added and deleted with one association message respectively.

8. The method of claim 6 wherein the association message comprises an additional information field which determines if the associations have a sequence number of an associated external station.

9. The method of claim 8 wherein an information field of the association message comprises a value based on which the presence of the sequence number for each association shall be controlled separately.

10. A mesh network comprising:
a first edge node;
a second edge node communicatively connected to the first edge node;
wherein the first edge node of the network nodes serves as a connection point for a first station disjunctive to the mesh network, and wherein the second edge node serves as a connection point for said second station that is disjunctive to the mesh network, wherein the first and second stations are external stations in relation to the mesh network;
in response to switching the first disjunctive station from the first edge node to the second edge node, association information of the first edge node being updated via an association message sent by the second edge node and received by the first edge node, the association message identifying association information of the disjunctive stations that are external to the mesh network that are connected to at least one of a third edge node of the mesh network and the second edge node, wherein the association message has a structure having a plurality of fields, the fields comprising an element identification field, a length field, a flags field, a sequence number field, and at least one validity period field and at least one information field, the at least one validity period field having a value therein to indicate a validity period for at least a portion of the association information of the association message, and each of the at least one information field comprising at least one of:
a first area identifying the second edge node once and identifying a plurality of disjunctive stations to which the second edge node is connected to identify the disjunctive stations connected to the second edge node, and
a second area identifying complete associations, each of the complete associations identified in the second area identifying the third edge node and a respective one of the disjunctive stations to which that third edge node is connected;

wherein the at least one information field comprises a first information field that only has the first area, the first area comprising a plurality of fields, the fields of the first area identifying an address of the second edge node and an address for each of the disjunctive stations to which the second edge node is connected to identify associations the second edge node has with the disjunctive stations to which the second edge node is connected identified in the first information field;

wherein the at least one information field comprises a second information field that only has the second area, the second area comprising a plurality of fields that each identify an address of the third edge node and an address for a respective one of the disjunctive stations to which that third edge node is connected to identify an association of the third edge node to that respective one of the disjunctive stations; and wherein the first area of the first information field has a flags field that has information identifying whether a validity period of one of the at least one validity period field applies to all associations of the first information field and the second information field has a flags field that has information therein to identify that a validity period of another one of the at least one validity period field applies to one of the associations identified in the second information field.

11. The system of claim 10 wherein the first information field has a field to identify whether associations for the identified disjunctive stations in the first information field is to be added and wherein the second information field has at least one field to identify whether at least one association identified in the second information field is to be added.

* * * * *